Figure 1:
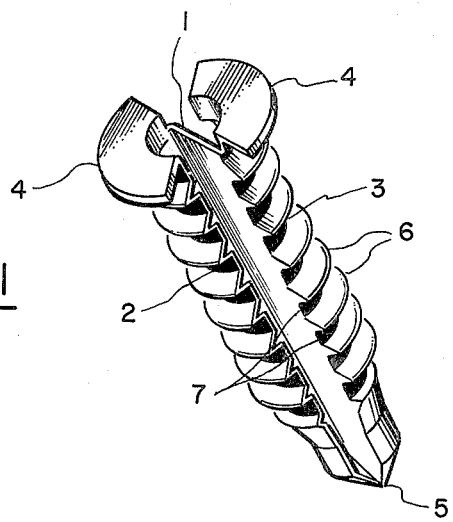

March 15, 1966     R. P. SANDOR     3,240,102
SELF-DRILLING SHEET METAL SCREW
Filed Feb. 24, 1964

INVENTOR
RAYMOND P. SANDOR
BY
ATTORNEY

United States Patent Office 3,240,102
Patented Mar. 15, 1966

3,240,102
SELF-DRILLING SHEET METAL SCREW
Raymond P. Sandor, 21 Cherry St., Darien, Conn.
Filed Feb. 24, 1964, Ser. No. 346,850
2 Claims. (Cl. 85—47)

This invention relates to a self drilling, self adjusting screw or screw fastener.

Wood screws and to a somewhat less, but still important extent, sheet metal screws, present a number of problems. In a wood screw it is necessary to drill a small, short pilot hole which is often done with a gimlet. In the case of sheet metal of course the hole is normally drilled all the way through the metal. The screw is then driven by turning with a screw driver or other tool and the threads of the screw cut their way through the wood or into the edges of the metal hole in the case of sheet metal screws, the whole screw being turned in until it is tight.

In the case of the wood screw, particularly a screw of larger size or greater length and especially when the screw is used with certain hard wood, the driving of the screw has to compress the wood fibers and exerts a very severe wedging action. The result is that there may be a tremendous amount of force required to drive the screw near the end of its travel and the wedging action often presents problems because it can split certain woods. As a result is is often been necessary to drill a hole in the wood only a little smaller than the screw. This presents problems because it doubles the amount of time taken and unless great care is exercised in chosing the proper drill the hole may either be too small which results in a hard driving screw with possibilities of splitting or it may be too large which leaves insufficient wood fibers to engage the whole depth of the screw threads. With sheet metal screws, the hole drilled through is always necessary but when first driven the problem of hole size may not be quite as serious as with wood screws because sheet metal screws are designed to be screwed into holes corresponding to standard drill sizes.

After the fastening, whether a wood screw or a sheet metal screw, has been first driven problems are not necessarily at an end. In the case of the wood screw, the wood swells and shrinks with alternating cycles of dampness and drying out. Thus the wood alternately grips the screw tighter. When it shrinks or moves away from the screw slightly it expands. Since the wood fibers have been crushed by forcing the screw through them, they have but little elasticity and so if the wood has been subjected to repeated cycles of drying and becoming moist, screws may become loose.

An even more serious problem arises when sheet metal screws are screwed out and then refastened. Theoretically one would suppose that a sheet metal screw would follow exactly the grooves cut by the first driving. As a matter of practice, however, this by no means always takes place. The sheet metal screw is not like an ordinary metal screw. The threads are sharp cutters and may even be serrated by interruptions in the thread. Unless therefore a sheet metal screw is started exactly in the groove originally cut and turned in at first with extreme gentleness, the sharp cutting thread edges tend to cut a new path. However there is only a small amount of metal left and very soon these paths cut away so much metal that the sheet metal screw no longer holds. It goes without saying that the theoretically possible extreme care which has been described above almost never is exercised in practice. When a sheet metal screw has been used more than two or three times therefore it no longer holds tightly and it is then necessary to use an oversized sheet metal screw with concomitant difficulties because the next size requires either drilling out the original hole to a larger size or excessive force in driving the oversized screw through the metal.

Another problem arises which is more serious with the wood screw usually than with a sheet metal screw and that is that there is no good way for the wood displaced by the screw to leave the hole. This increases the force required to drive the screw and the splitting effect or requires drilling of a very accurately undesired hole to start with. Another factor which is applicable both to sheet metal screws and to wood screws is that of cost. These fastenings are used in very large numbers and so a cheap construction becomes of utmost economic importance.

The individual problems or drawbacks of the ordinary screw have received much thought in the past century and individual problems have been partly or wholly solved. For example, the problem of predrilling a hole for a wood screw has been solved by an interrupted thread wood screw in which the end is formed as a flat wood drill. It has also been proposed to provide longitudinal grooves to discharge wood cut by the drill. However these grooves have been very shallow in order not to affect adversely the strength of the screw and so even the solution of this single problem has not been complete. Certain machine screws have also been made in split forms so that they spring against the threads and a lock washer like effect is obtained.

As far as reduction of costs are concerned, it has been proposed to stamp a screw out of sheet metal. This however has been effected in stamping out relatively thin tongues from a central head and has not produced a screw which solves the other problems and hence this type of stamped screw has never achieved any practical success.

The present invention utilizes a combined screw and drill which is stamped, which is strong and rigid and drills and cuts through, provides relatively enormous waste exists so that this problem in wood screw fastenings is solved completely and at the same time a fastening is produced which is springy and therefore maintains its tightness regardless of cycles of shrinking and swelling in wood and this same characteristic also reduces to a very large extent and sometimes eliminates the problems of multiple reuses of sheet metal screws. At the same time the screw is produced cheaply by stamping and so all of the desirable features of individual proposals are combined in a single screw which can be cheaply made and is of maximum effectiveness.

Essentially the present invention uses a Z-shaped stamping of fairly heavy metal. The center portion of the Z forms a cutting edge on either side in the case of wood screws and is developed into a drill point at its end for both wood and metal uses. Threads are stamped or cut in the other two sides of the Z which are curved in the form of arcs of circles. The whole structure is springy and achieves fully the functions of self adjustment to conditions including, as will be pointed out below, improved reuse possibilities for sheet metal screws.

Figure 2:
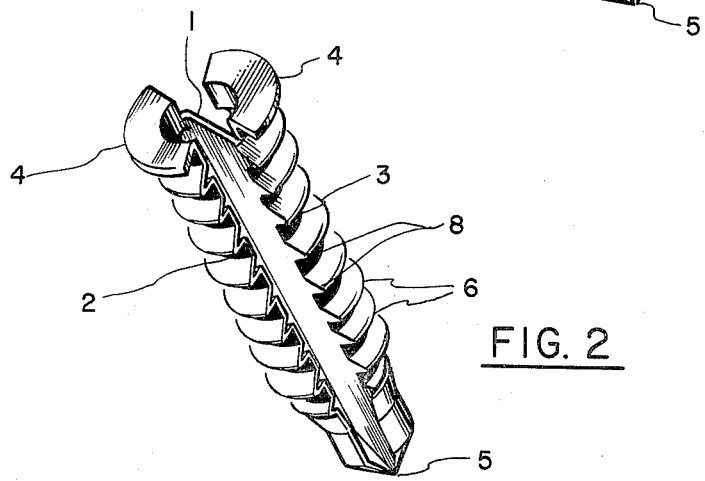

The invention will be described in greater detail in conjunction with the drawing in which:

FIG. 1 is an isometric view of the wood screw, and
FIG. 2 a similar view of the sheet metal screw of the self tapping variety.

In FIG. 1 a wood screw is made up from a Z-shaped stamping with a central portion 1 and two curved sides 2 and 3. The upper ends of the sides 2 and 3 are turned over to form lips 4 which act as the screw head. The bottom of the Z-shaped stamping is developed into a drill point 5. Threads 6 are stamped or cut in the sides 2 and 3. The screw in FIG. 1 is shown with the separation between sides 2 and 3 exaggerated in order to make the construction more clear. In actual use the Z will be more compressed. The drill is slightly tapered as is the starting thread or threads.

In use the screw is started in wood, either with no preliminaries or with a small indentation, which can be made with a punch. In the case of certain hard woods sometimes the indentation is made a little deeper with a gimlet or similar device. As the screw is turned, which is effected with a simple driver having a slot at the end fitting over the central piece of metal 1, the drill point 5 cuts into the wood. After a certain distance, the edges of the member 1 between the threads act as cutting edges. These are indicated at 7 in the drawing. The screw penetrates the wood easily and its springiness causes it to close until the sides 2 and 3 meet or almost meet. Wood cut out by the drill point 5 and the cutting edges 7 moves upwardly between the round portion 2 and the center 1 and the round portion 3 and the center 1. These channels are relatively enormous compared to small grooves which have been proposed in some previously solid screws. The wood cut out moves out without hindrance and thus the screw can be driven with minimum force and there is a minimum mangling or shredding of the wood through which the screw threads 6 pass. When the screw is tight, a strong fastening results which is just as stiff as a solid screw for the portion 1 is of course very stiff to bending in its wide dimension. The screw remains tight because if the wood loosens the screw expands the two rounded portions 2 and 3 springing away slightly from the center portion 1. The screw therefore remains tight and if the wood shrinks again on it the springiness of the same members maintains continuous tight contact. Because little or no crushing and mangling of the wood has been effected by the threads the screw can be reused a number of times in the same hole without becoming loose. Any slight enlargement is taken care of by the springing out of the rounded sides 2 and 3.

Another advantage is encountered if the screw has to be removed after a long time. With an ordinary screw sometimes the wood shrinks so tightly around the threads that it is difficult to remove and the head slot in the screw can easily be deformed. In the present case the springiness of the sides 2 and 3 make it possible to remove a screw even after it has been in wood for a long time without damaging the head. It should be noted that the driver which is slotted extends for a considerable distance over the member 1 which can be much greater than the depth of a conventional screw slot or cross slots in the case of the Phillips type head. This greater reliability is a practical advantage and is offset only to a slight extent by the need for special driving blades.

The sheet metal screw of FIG. 2 is very similar to the wood screw of FIG. 1. The same elements bear same reference numerals. Of course the drill point and threads must be hardened to cut metal but it is not essentially different in form. In practice the whole screw is normally case hardened. However, the threads are somewhat different. In a sheet metal screw of the self-tapping variety for thicker metal the cutting of the metal requires a sharper edge and so the cutting may be primarily effected with a sharp edge 8 of the threads 6. For thinner metal self tapping is not essential and the screw resembles that of FIG. 1 except that, of course, it must be case hardened and usually the pitch is considerably coarser.

It will be noted that if a sheet metal screw according to FIG. 2 has been driven in once and then removed it can be started again with far less likelihood of having to cut a completely new path. The springiness of the screw tends to cause it to follow the original groove cut much more readily than does a solid sheet metal screw. Therefore with a minimum of care in reuse, sheet metal screws, according to the present invention may be reused more times than is the case with solid screws.

It will be seen that the screws of the present invention solve all the problems at the same time with a single device and there is no compromise. At the same time a number of the members perform dual functions. For example, the member 1 performs a drilling, stiffening and driving function. The members 1, 2 and 3 perform the function of forming the screw body and at the same time providing enormous waste wood discharge channels in the case of the wood screw.

Normally when a single structure performs so many functions, this involves a compromise. In the present case there is no compromise. The screw is just as effective as the best interrupted thread solid drill screws previously used. The discharge for cut wood is better and the spring take-up is also more reliable. At the same time the screws can be produced economically by stamping from sheet metal and so there is not an excessive cost for the new functions that are performed by the screw. At the same time it should be noted that the screw is lighter because it is hollow than is a solid screw which is sometimes an advantage and is never a drawback.

I claim:
1. A resilient one-piece screw fastener of metal in sheet form having a transverse cross-section in substantially the form of a Z shape with a central member being relatively stiff and having a tapered point at one end thereof and the other two legs of the Z being arcuately curved to form a pair of opposed interrupted surfaces spaced from the center member by longitudinally extending grooves and defining the circumferential extent of the final screw, the curved surfaces being provided with external partial threads extending completely across each of said surfaces throughout a major portion of their axial extent, and the ends of the curved surfaces being progressively tapered in a manner corresponding to the taper of the center member to form a substantially conical penetrating tip being interrupted by said longitudinal grooves, at least one thread on each of said curved surfaces adjacent the conical tip being slightly tapered, the edges of the center member between threads being developed as cutting edges whereby when driven the screw cuts its own hole and presses firmly to maintain constant tightness with the material into which it is screwed and ejects cuttings formed between the center member and the two curved members, each of said other two legs having radially outwardly extending flange portions at the opposite end thereof defining a driving means therebetween.

2. A self tapping sheet metal screw according to claim 1 in which the edges of the interrupted threads are case hardened and developed as cutting edges.

References Cited by the Examiner

UNITED STATES PATENTS

| 2,110,959 | 3/1938 | Lombard. | |
| 2,549,393 | 4/1951 | Siesel | 85—47 |
| 3,125,923 | 3/1964 | Hanneman | 85—47 |

EDWARD C. ALLEN, *Primary Examiner.*

CARL W. TOMLIN, *Examiner.*